(12) United States Patent
Akashi et al.

(10) Patent No.: US 10,840,519 B2
(45) Date of Patent: Nov. 17, 2020

(54) FUEL CELL SYSTEM

(71) Applicant: KABUSHIKI KAISHA TOYOTA CHUO KENKYUSHO, Nagakute (JP)

(72) Inventors: Teruhisa Akashi, Nagakute (JP); Hirofumi Funabashi, Nagakute (JP); Hidehito Matsuo, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 68 days.

(21) Appl. No.: 15/865,597

(22) Filed: Jan. 9, 2018

(65) Prior Publication Data

US 2018/0261856 A1 Sep. 13, 2018

(30) Foreign Application Priority Data

Mar. 7, 2017 (JP) ................................. 2017-042913

(51) Int. Cl.
*H01M 8/04014* (2016.01)
*H01M 8/0271* (2016.01)
(Continued)

(52) U.S. Cl.
CPC ..... *H01M 8/04022* (2013.01); *H01M 8/0271* (2013.01); *H01M 8/0289* (2013.01);
(Continued)

(58) Field of Classification Search
CPC ............. H01M 8/04022; H01M 8/249; H01M 8/04007; H01M 8/04037; H01M 8/0271;
(Continued)

(56) References Cited

U.S. PATENT DOCUMENTS

2003/0039874 A1* 2/2003 Jankowski .......... H01M 8/2425
429/434
2004/0048132 A1* 3/2004 Takai .................. H01M 8/0228
429/513
(Continued)

FOREIGN PATENT DOCUMENTS

JP 2003-272662 A 9/2003
JP 2004-111307 A 4/2004
(Continued)

OTHER PUBLICATIONS

Mar. 26, 2019 Office Action Issued in Japanese Patent Application No. 2017-042913.
(Continued)

*Primary Examiner* — Ula C Ruddock
*Assistant Examiner* — Matthew W Van Oudenaren
(74) *Attorney, Agent, or Firm* — Oliff PLC (57) ABSTRACT

A fuel cell system may include a first fuel cell provided on a first substrate; a second fuel cell provided on a second substrate, and having a power generation capacity higher than a power generation capacity of the first fuel cell; a first heater provided at the first fuel cell; a second heater provided at the second fuel cell; and a battery, wherein the first heater heats the first fuel cell by using power supplied from the battery, and wherein the second heater heats the second fuel cell by using power supplied from the first fuel cell.

14 Claims, 7 Drawing Sheets

(51) Int. Cl.
| | |
|---|---|
| *H01M 8/0289* | (2016.01) |
| *H01M 8/04089* | (2016.01) |
| *H01M 8/1007* | (2016.01) |
| *H01M 8/1018* | (2016.01) |
| *H02J 3/38* | (2006.01) |
| *H01M 8/0662* | (2016.01) |
| *H02J 1/00* | (2006.01) |
| *H01M 8/249* | (2016.01) |
| *H01M 8/04007* | (2016.01) |
| *H02J 7/34* | (2006.01) |

(52) U.S. Cl.
CPC ... *H01M 8/04007* (2013.01); *H01M 8/04037* (2013.01); *H01M 8/04089* (2013.01); *H01M 8/1007* (2016.02); *H01M 8/1018* (2013.01); *H01M 8/249* (2013.01); *H02J 3/387* (2013.01); *H01M 8/0662* (2013.01); *H02J 7/34* (2013.01); *H02J 2300/30* (2020.01)

(58) Field of Classification Search
CPC ........... H01M 8/0289; H01M 8/04089; H01M 8/1018; H01M 8/1007; H01M 8/0662
See application file for complete search history.

(56) References Cited

U.S. PATENT DOCUMENTS

| | | | |
|---|---|---|---|
| 2005/0037249 A1* | 2/2005 | Zizelman | H01M 8/04007 429/425 |
| 2006/0073368 A1 | 4/2006 | Chiu | |
| 2007/0072042 A1* | 3/2007 | Lam | H01M 8/04201 429/443 |
| 2007/0087235 A1 | 4/2007 | Kim et al. | |
| 2009/0208791 A1 | 8/2009 | Chiu | |
| 2009/0208792 A1 | 8/2009 | Chiu | |
| 2009/0208794 A1 | 8/2009 | Chiu | |
| 2009/0208802 A1 | 8/2009 | Chiu | |

FOREIGN PATENT DOCUMENTS

| | | | |
|---|---|---|---|
| JP | 2004-171881 A | | 6/2004 |
| JP | 2004171881 | * | 6/2004 |
| JP | 2006-065770 A | | 3/2006 |
| JP | 2006-108104 A | | 4/2006 |
| JP | 2006-278074 A | | 10/2006 |
| JP | 2007-103031 A | | 4/2007 |
| JP | 2007103031 | * | 4/2007 |
| JP | 2007-115677 A | | 5/2007 |

OTHER PUBLICATIONS

Jul. 23, 2019 Office Action issued in Japanese Patent Application No. 2017-042913.

* cited by examiner

FUEL CELL SYSTEM

TECHNICAL FIELD

A technique disclosed herein relates to a fuel cell system.

BACKGROUND

Japanese Patent Application Publication No. 2004-111307 describes a fuel cell system including a fuel cell, a heater provided at the fuel cell, and a battery. In this fuel cell system, the heater heats the fuel cell by using power supplied from the battery. In this fuel cell system, when the fuel cell is to be activated, a temperature of the fuel cell is raised to a predetermined reaction temperature by heating by the heater.

SUMMARY

Since a fuel cell having a higher power generation capacity is larger in size, a thermal capacity of the fuel cell itself is also higher. Due to this, when the fuel cell is to be activated, it takes a long period of time to heat the fuel cell up to a temperature at which a power generation reaction starts. Especially in a configuration where a fuel cell is heated by electrical conduction from a battery to a heater, if the battery is small in size, a heating capability of the heater cannot be made much high, which results in a long period of time to raise a temperature of the fuel cell and difficulty in activating the fuel cell promptly.

The disclosure herein provides a technique to solve the above problem. The disclosure herein provides a technique capable of activating a fuel cell having a high power generation capacity in a short period of time.

The disclosure herein discloses a fuel cell system. The fuel cell system may comprise a first fuel cell provided on a first substrate; a second fuel cell provided on a second substrate, and having a power generation capacity higher than a power generation capacity of the first fuel cell; a first heater provided at the first fuel cell; a second heater provided at the second fuel cell; and a battery. In this fuel cell system, the first heater may heat the first fuel cell by using power supplied from the battery, and the second heater may heat the second fuel cell by using power supplied from the first fuel cell.

When the above-described fuel cell system is to be activated, the first fuel cell having the low power generation capacity is firstly heated by electrical conduction from the battery to the first heater. The battery may be small in size, and for example, may be a dry cell battery. Since the first fuel cell, which is an auxiliary cell, has the low power generation capacity, it is small in size and has a low thermal capacity. Therefore, even when a heating capability of the first heater which is driven by the power from the battery is not much high, the temperature of the auxiliary first fuel cell is raised promptly, and power generation in the first fuel cell is promptly started. Upon the start of the power generation in the auxiliary first fuel cell, the second fuel cell having the high power generation capacity is heated by electrical conduction from the first fuel cell to the second heater. The second fuel cell, which is a main cell, has the high power generation capacity, and thus it is large in size and has a high thermal capacity. Nevertheless, by driving the second heater by the power from the auxiliary first fuel cell, instead of by the power from the battery, a heating capability of the second heater can be made high. Due to this, the temperature of the main second fuel cell can be raised promptly, and power generation in the second fuel cell can be promptly started. According to the above-described fuel cell system, a fuel cell having a high power generation capacity can be activated in a short period of time.

In the fuel cell system, the first substrate and the second substrate may be provided on a third substrate which is different from the first substrate and the second substrate.

In the above-described fuel cell system, upon heating the second fuel cell, the second fuel cell is heated by the heating of the second heater using the power from the first fuel cell, as well as by heat, which is generated accompanying the power generation of the first fuel cell, transferring from the first substrate to the second substrate via the third substrate. In such a configuration, the second fuel cell can be activated further promptly.

In the fuel cell system, the first substrate and the second substrate may be seamlessly continuous.

In the above-described fuel cell system, upon heating the second fuel cell, the second fuel cell is heated by the heating of the second heater using the power from the first fuel cell, as well as by the heat, which is generated accompanying the power generation of the first fuel cell, transferring from the first substrate directly to the second substrate. In such a configuration, the second fuel cell can be activated more promptly.

In the fuel cell system, the first heater may be provided on the first substrate, and the second heater may be provided on the second substrate.

According to the above-described fuel cell system, the first heater configured to heat the first fuel cell and the second heater configured to heat the second fuel cell can be realized in simple configurations.

In the fuel cell system, discharge of a fuel gas and/or air from the first fuel cell may be prohibited when the first heater heats the first fuel cell.

According to the above-described fuel cell system, heat dissipation from the first fuel cell due to the discharge of fuel gas and/or air can be suppressed while the first fuel cell is heated to be activated by the first heater. Due to this, the temperature of the first fuel cell can be raised promptly.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved fuel cell systems, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

Figure 1:
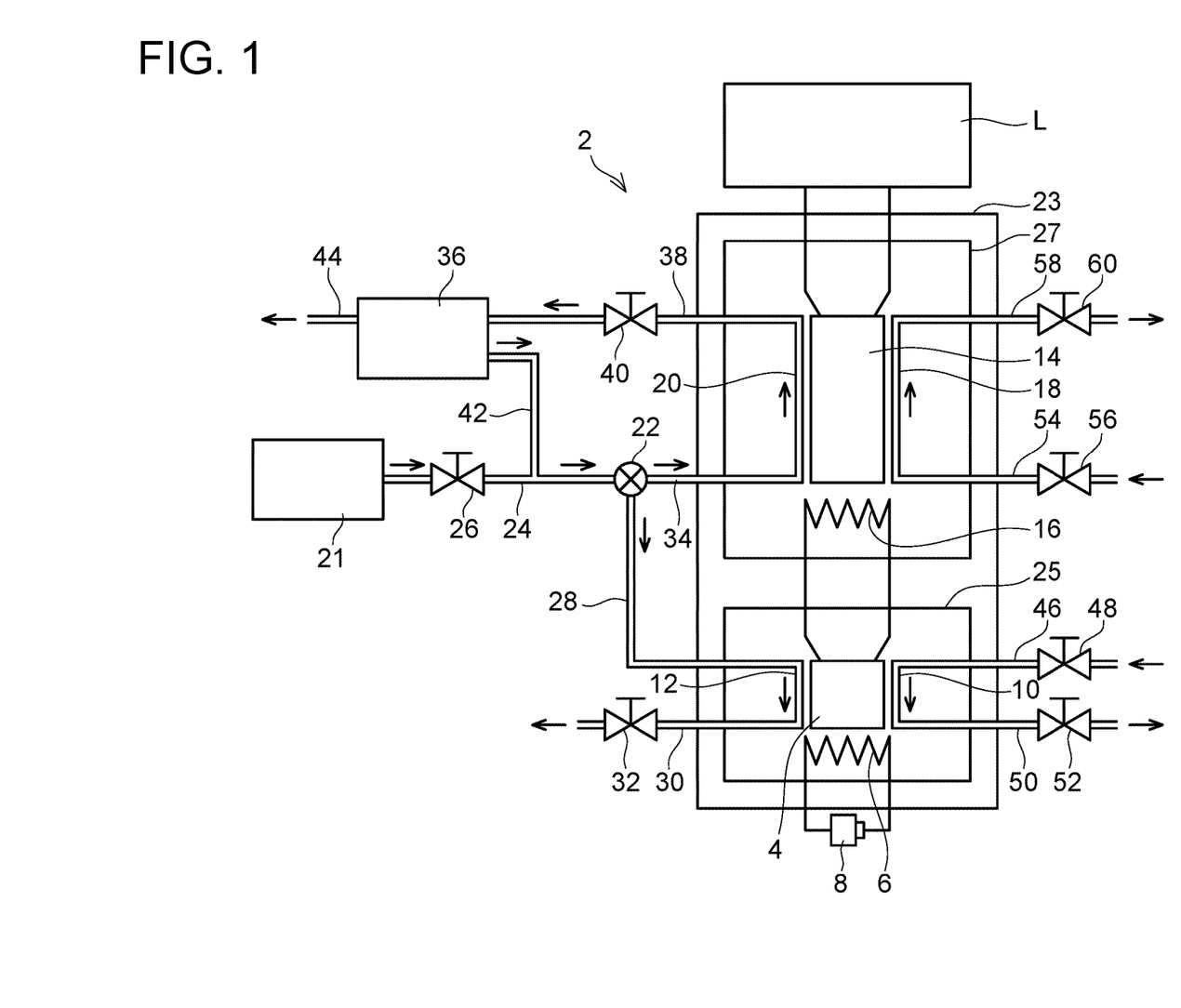
FIG. 1 is a block diagram of a fuel cell system 2 of a first embodiment.

FIG. 1 schematically shows a configuration of a fuel cell system 2 of a first embodiment. The fuel cell system 2 generates electricity, heat, and vapor by having oxygen in air react with hydrogen in a fuel gas.

The fuel cell system 2 comprises a first fuel cell 4 which is an auxiliary cell, a first heater 6 provided at the first fuel cell 4 and configured to heat the first fuel cell 4 to between 500 to 700 degrees Celsius, a compact battery 8 configured to supply power to the first heater 6, a first air reaction path 10 through which air flows in the first fuel cell 4, and a first fuel reaction path 12 through which a fuel gas flows in the first fuel cell 4. The first fuel cell 4 is a solid-oxide fuel cell (SOFC), and generates electricity, heat, and vapor by a chemical reaction between oxygen in the air within the first air reaction path 10 and hydrogen in the fuel gas within the first fuel reaction path 12. The battery 8 is a portable dry cell.

The fuel cell system 2 comprises a second fuel cell 14 which is a main cell, a second heater 16 provided at the second fuel cell 14 and configured to heat the second fuel cell 14 to between 500 to 700 degrees Celsius, and a second air reaction path 18 through which the air flows in the second fuel cell 14, and a second fuel reaction path 20 through which the fuel gas flows in the second fuel cell 14. The second fuel cell 14 is a solid-oxide fuel cell (SOFC), and generates electricity, heat, and vapor by a chemical reaction between oxygen in the air within the second air reaction path 18 and hydrogen in the fuel gas within the second fuel reaction path 20. The main second fuel cell 14 is larger in size than the auxiliary first fuel cell 4, and has a higher power generation capacity than the first fuel cell 4. Power generated in the auxiliary first fuel cell 4 is supplied to the second heater 16. Power generated in the main second fuel cell 14 is supplied to a target load L.

In the fuel cell system 2, the first fuel cell 4, the first heater 6, the first air reaction path 10, and the first fuel reaction path 12 are provided at a first substrate 25. Further, the second fuel cell 14, the second heater 16, the second air reaction path 18, and the second fuel reaction path 20 are provided at a second substrate 27. Then, the first substrate 25 and the second substrate 27 are provided on a substrate 23. That is, it can be said that the first fuel cell 4 and the second fuel cell 14 are provided on the same substrate 23 in the fuel cell system 2 of the present embodiment. Further, in the fuel cell system 2 of the present embodiment, the first substrate 25 on which the first fuel cell 4 is provided and the second substrate 27 on which the second fuel cell 14 is provided may be formed so as to be seamlessly continuous to constitute the substrate 23. On the contrary, the first substrate 25 and the second substrate 27 may be formed to be separate without providing the substrate 23.

The fuel cell system 2 comprises a hydrogen cartridge 21 which is filled with hydrogen as the fuel gas; a three-way valve 22 configured to switch supplying destinations of the fuel gas between the first fuel cell 4 and the second fuel cell 14; a fuel supply path 24 for supplying the fuel gas from the hydrogen cartridge 21 to the three-way valve 22; a pressure reducing valve 26 provided on the fuel supply path 24; a first fuel supply path 28 for supplying the fuel gas from the three-way valve 22 to the first fuel reaction path 12 of the first fuel cell 4; a first fuel discharge path 30 for discharging a post-reaction fuel gas front the first fuel reaction path 12 of the first fuel cell 4 to an outside of the fuel cell system 2; a sealing valve 32 provided on the first fuel discharge path 30; a second fuel supply path 34 for supplying the fuel gas from the three-way valve 22 to the second fuel reaction path 20 of the second fuel cell 14; a fuel collector 36 configured to separate the post-reaction fuel gas into hydrogen and vapor; a second fuel discharge path 38 for discharging the post-reaction fuel gas from the second fuel reaction path 20 of the second fuel cell 14 to the fuel collector 36; a sealing valve 40 provided on the second fuel discharge path 38; a fuel collecting path 42 for supplying hydrogen that is separated in the fuel collector 36, as the fuel gas, to the fuel supply path 24 that is located downstream with respect to the pressure reducing valve 26; and a vapor discharge path 44 for discharging vapor that is separated in the fuel collector 36 to the outside of the fuel cell system 2.

The fuel cell system 2 comprises a first air supply path 46 for supplying the air to the first air reaction path 10 of the first fuel cell 4 from the outside of the fuel cell system 2; an on-off valve 48 provided on the first air supply path 46; a first air discharge path 50 for discharging post-reaction air from the first air reaction path 10 of the first fuel cell 4 to the outside of the fuel cell system 2; a sealing valve 52 provided on the first air discharge path 50; a second air supply path 54 for supplying the air to the second air reaction path 18 of the second fuel cell 14 from the outside of the fuel cell system 2; an on-off valve 56 provided on the second air supply path 54; a second air discharge path 58 for discharging the post-reaction air to the outside of the fuel cell system 2 from the second air reaction path 18 of the second fuel cell 14; and a sealing valve 60 provided on the second air discharge path 58.

When the fuel cell system 2 is to be activated, the pressure reducing valve 26 is opened with the three-way valve 22 switched to a first fuel cell 4 side. Then, upon when the first fuel reaction path 12 of the first fuel cell 4 is filled with the fuel gas, the sealing valve 32 and the pressure reducing valve 26 are closed. Further, the on-off valve 48 is opened, and upon when the first air reaction path 10 of the first fuel cell 4 is filled with the air, the sealing valve 52 and the on-off valve 48 are closed. Then, electrical conduction from the battery 8 to the first heater 6 is started to start heating the first fuel cell 4 by the first heater 6. In the fuel cell system 2 of the present embodiment, the pressure reducing valve 26 and the sealing valve 32 are closed while the first heater 6 is heating the first fuel cell 4, and thus an inflow of the fuel gas to the first fuel cell 4 and an outflow of the fuel gas from the first fuel cell 4 are prohibited. Further, in the fuel cell system 2 of the present embodiment, the on-off valve 48 and the sealing valve 52 are closed while the first heater 6 is heating the first fuel cell 4, and thus an inflow of the air to the first fuel cell 4 and an outflow of the air from the first fuel cell 4 are prohibited. Due to this, heat dissipation from the first fuel cell 4 via the fuel gas and the air can be suppressed, and the temperature of the first fuel cell 4 can be raised promptly.

When the temperature of the first fuel cell 4 reaches a predetermined reaction temperature, for example 600 degrees Celsius, by the heating of the first heater 6, power generation is started in the first fuel cell 4 due to the chemical reaction between oxygen in the air within the first air reaction path 10 and hydrogen in the fuel gas within the first fuel reaction path 12. Since the chemical reaction between oxygen and hydrogen is also an exothermic reaction, the first fuel cell 4 is maintained at a high temperature after the start of power generation even when the heating of the first heater 6 is stopped, and the power generation continues. Thereafter, the sealing valve 32 and the sealing valve 52 are opened to discharge gas that did not contribute to the reaction in the first fuel cell 4 and vapor generated in the reaction to the outside of the fuel cell system 2, and the pressure reducing valve 26 and the on-off valve 48 are also opened to supply the fuel gas and the air to the first fuel cell 4 again. By repeating this cycle, the power generation by the first fuel cell 4 continues.

The power generated by the first fuel cell 4 is supplied to the second heater 16 of the second fuel cell 14. During the power generation by the first fuel cell 4, the second fuel cell 14 is heated by the second heater 16. Further, since the first fuel cell 4 and the second fuel cell 14 are provided on the same substrate 23, the second fuel cell 14 is heated also by heat that is generated accompanying the power generation of the first fuel cell 4 transferring to the second fuel cell 14.

As described above, the temperature of the second fuel cell 14 is raised due to the power generation by the first fuel cell 4, and upon when the temperature of the second fuel cell 14 reaches a predetermined reaction temperature, for example 600 degrees Celsius, the fuel cell system 2 terminates the power generation in the first fuel cell 4 and starts power generation in the second fuel cell 14. That is, the pressure reducing valve 26 is opened with the three-way valve 22 switched to a second fuel cell 14 side. Then, when the second fuel reaction path 20 of the second fuel cell 14 is filled with the fuel gas, the sealing valve 40 and the pressure reducing valve 26 are closed. Further, the on-off valve 56 is opened, and when the second air reaction path 18 of the second fuel cell 14 is filled with the air, the sealing valve 60 and the on-off valve 56 are closed. Since the second fuel cell 14 has already reached the predetermined temperature, for example 600 degrees Celsius, the power generation is started in the second fuel cell 14 due to the chemical reaction between oxygen in the air within the second air reaction path 18 and hydrogen in the fuel gas within the second fuel reaction path 20. Since the chemical reaction between oxygen and hydrogen is also an exothermic reaction, the second fuel cell 14 is maintained at a high temperature after the start of power generation even without the heating of the second heater 16 or the heat transfer from the first fuel cell 4, and the power generation continues. Thereafter, the sealing valve 40 and the sealing valve 60 are opened to discharge gas that did not contribute to the reaction in the second fuel cell 14 and vapor generated in the reaction, and the pressure reducing valve 26 and the on-off valve 56 are also opened to supply the fuel gas and the air again to the second fuel cell 14. By repeating this cycle, the power generation by the second fuel cell 14 continues. The power generated by the second fuel cell 14 is supplied to the target load L.

The post-reaction fuel gas that was discharged from the second fuel cell 14 is separated into hydrogen and vapor in the fuel collector 36. The vapor separated in the fuel collector 36 is discharged to the outside of the fuel cell system 2 through the vapor discharge path 44. Hydrogen separated in the fuel collector 36 is supplied again to the fuel supply path 24 as the fuel gas.

It should be noted that although not shown, a pump for controlling the flow of the fuel gas may be provided on the fuel supply path 24, the first fuel supply path 28, the first fuel discharge path 30, the second fuel supply path 34, the second fuel discharge path 38, the fuel collecting path 42, and the like. Similarly, although not shown, a pump for controlling the flow of the air may be provided respectively on the first air supply path 46 and the first air discharge path 50, and on the second air supply path 54 and the second air discharge path 58, and the like. Further, although not shown, a heat sink for controlling heat dissipation from each of the first fuel cell 4 and the second fuel cell 14 may be provided.

Figure 2:
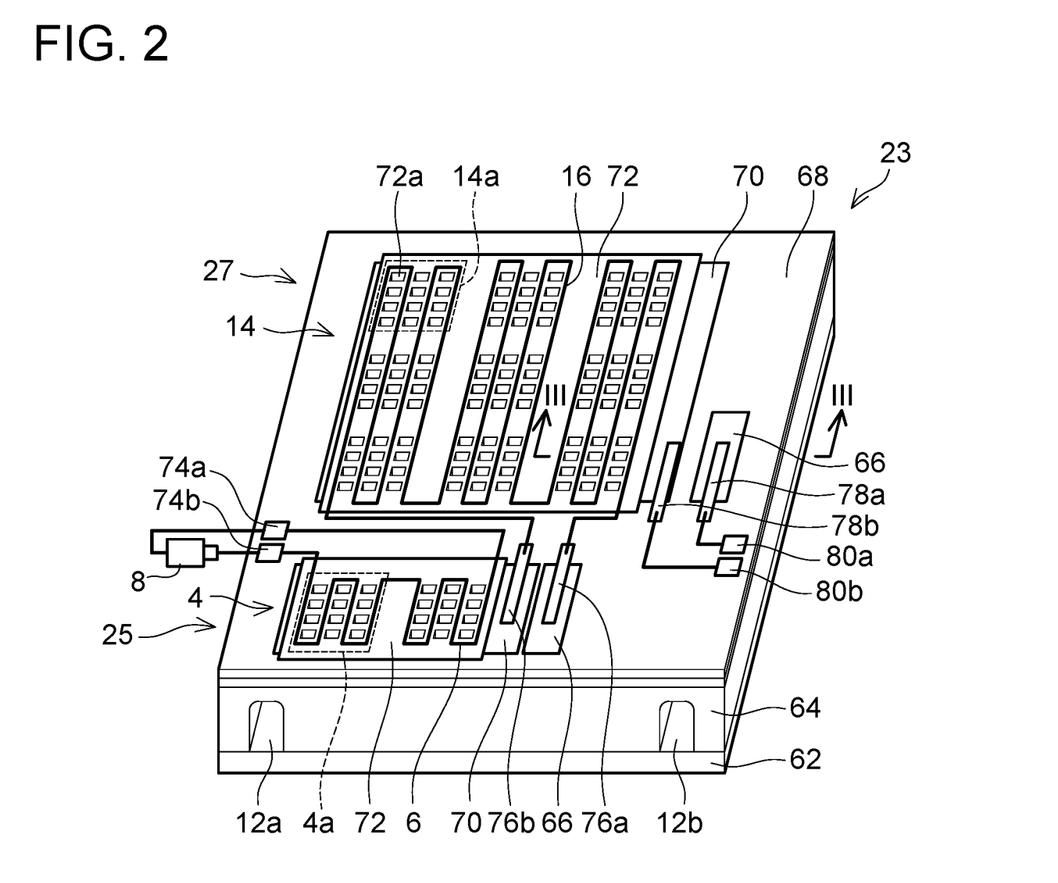
FIG. 2 is a schematic perspective view showing appearances of a first fuel cell 4 and a second fuel cell 14 of the first embodiment.
Figure 3:
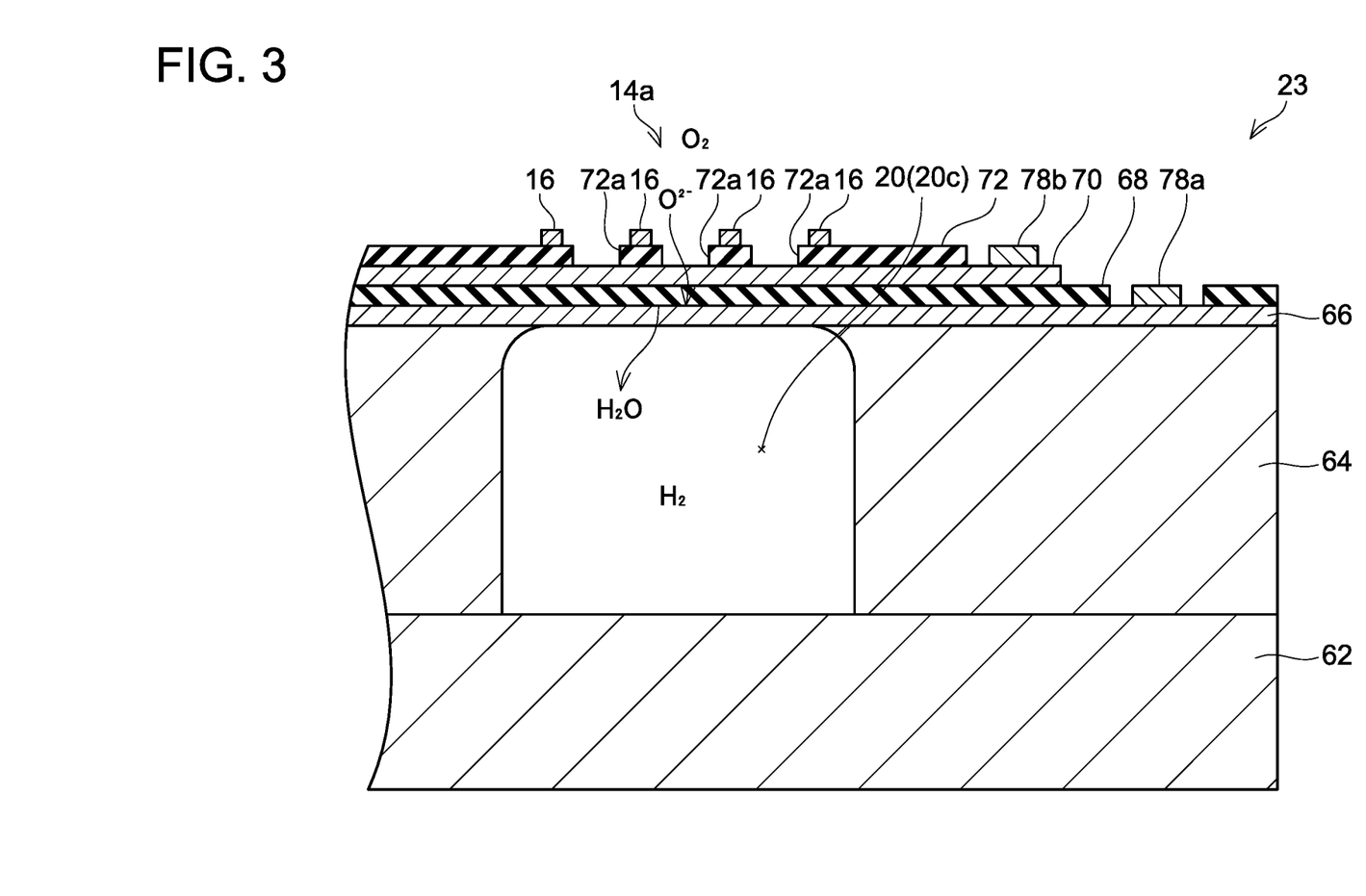
FIG. 3 is a cross sectional view along a line III-III in FIG. 2.
Figure 4:
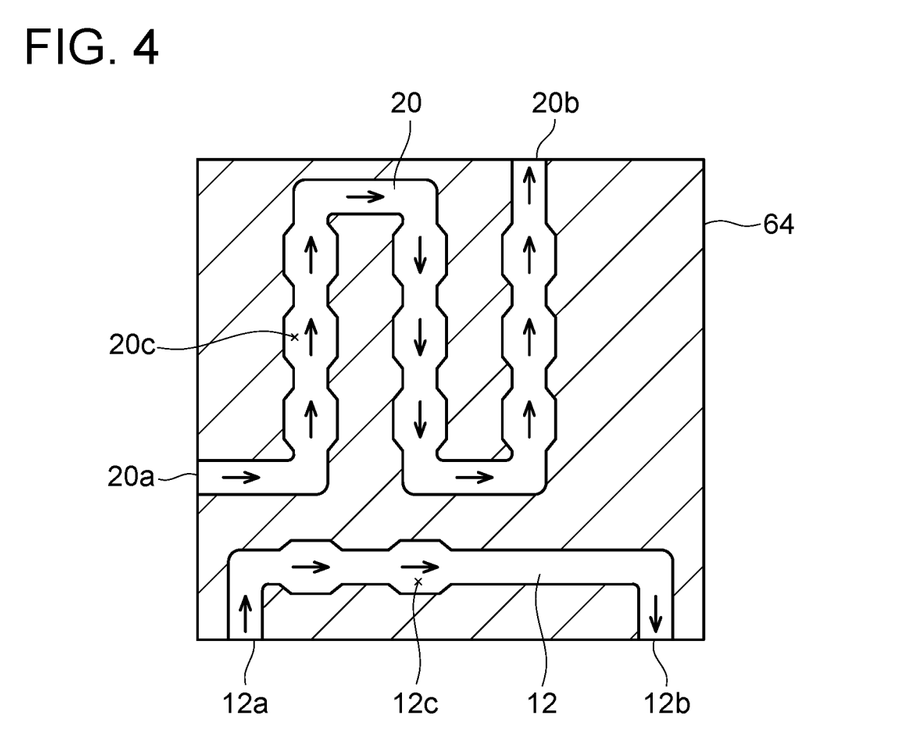
FIG. 4 is a plan view showing shapes of a first fuel reaction path 12 and a second fuel reaction path 20 of the first embodiment.

FIGS. 2, 3, and 4 schematically show a configuration of the substrate 23 provided with the first fuel cell 4, the first heater 6, the first air reaction path 10, the first fuel reaction path 12, the second fuel cell 14, the second heater 16, the second air reaction path 18, and the second fuel reaction path 20. As aforementioned, the first fuel cell 4, the first heater 6, the first air reaction path 10, and the first fuel reaction path 12 are provided at the first substrate 25, and the second fuel cell 14, the second heater 16, the second air reaction path 18, and the second fuel reaction path 20 are provided at the second substrate 27. In an example shown in FIGS. 2, 3, and 4, the first substrate 25 and the second substrate 27 are formed to be seamlessly continuous to constitute the substrate 23.

As shown in FIG. 2, the first fuel cell 4 comprises two first power generation elements 4a which are arranged in a 1-by-2 array. The second fuel cell 14 comprises nine second power generation elements 14a which are arranged in a 3-by-3 array. It should be noted that the number of the first power generation elements 4a of the first fuel cell 4 and the number of the second power generation elements 14a of the second fuel cell 14 are not limited to the numbers mentioned above. So long as the number of the second power generation elements 14a is larger than the number of the first power generation elements 4a, they may be provided in any numbers.

As shown in FIG. 3, the substrate 23 is a laminated substrate in which a first silicon substrate 62, a second silicon substrate 64, a first electrode film 66, an electrolyte film 68, a second electrode film 70, and an insulating film 72 are laminated in this order.

The first silicon substrate 62 and the second silicon substrate 64 are non-doped high resistivity silicon substrates. As shown in FIGS. 3 and 4, the first fuel reaction path 12 of the first fuel cell 4 and the second fuel reaction path 20 of the second fuel cell 14 are formed by etching within the second silicon substrate 64. The first fuel reaction path 12 comprises a first fuel inlet 12a and a first fuel outlet 12b. The fuel gas is supplied to the first fuel reaction path 12 through the first fuel inlet 12a. In the first fuel reaction path 12, a first fuel reaction chamber 12c is provided at a position corresponding to each of the first power generation elements 4a. Further, the post-reaction fuel gas is discharged from the first fuel reaction path 12 through the first fuel outlet 12b. The second fuel reaction path 20 comprises a second fuel inlet 20a and a second fuel outlet 20b. The fuel gas is supplied to the second fuel reaction path 20 through the second fuel inlet 20a. In the second fuel reaction path 20, a second fuel reaction chamber 20c is provided at a position corresponding to each of the second power generation elements 14a. Further, the post-reaction fuel gas is discharged from the second fuel reaction path 20 through the second fuel outlet 20b. As shown in FIGS. 2 and 3, the first fuel reaction path 12 and the second fuel reaction path 20, which are provided within the second silicon substrate 64, are sealed to be airtight by the first silicon substrate 62 on their lower surface side.

As shown in FIG. 3, the first electrode film 66 is laminated on an upper surface of the second silicon substrate 64. The first electrode film 66 is an electrode film with catalyst effect and current collecting effect, and is a metal film constituted of Pt, Cr/Ni, Ni,Pt, Ti/Pt, or Cr/Pt, or a compound or a laminated film including at least one of these elements. Alternatively, the first electrode film 66 may be a conductive film, e.g. a conductive ceramics film, including or carrying particles of at least one of these metals. The first electrode film 66 functions as a fuel electrode at the first fuel cell 4 and the second fuel cell 14. The first electrode film 66 in a range of the first fuel cell 4 and the first electrode film 66 in a range of the second fuel cell 14 are insulated from each other. The first electrode film 66 has a porous structure. A lower surface of the first electrode film. 66 is exposed to the first fuel reaction chambers 12c of the first fuel reaction path 12 and the second fuel reaction chambers 20c of the second fuel reaction path 20 within the second silicon substrate 64. The electrolyte film 68 is laminated on an upper surface of the first electrode film 66. The electrolyte film 68 is a thin layer constituted of LSO (lanthanum silicate), YSZ (yttria-stabilized zirconia), LaGaO3 (lanthanum gallate), or the like. A thickness of the electrolyte film 68 is approximately 20 to 2000 nm. The second electrode film 70 is laminated on an upper surface of the electrolyte film 68. The second electrode film 70 is an electrode film with catalyst effect and current collecting effect, and is a metal film constituted of Pt, Cr/NH, Ni/Pt, Ti/Pt, or Cr/Pt, or a compound or a laminated film including at least one of these elements. Alternatively, the second electrode film 70 may be a conductive is film, e.g. a conductive ceramics film, including or carrying particles of at least one of these metals. The second electrode film 70 functions as an air electrode at the first fuel cell 4 and the second fuel cell 14. The second electrode film 70 in the range of the first fuel cell 4 and the second electrode film 70 in the range of the second fuel cell 14 are insulated from each other. The second electrode film 70 has a porous structure.

The insulating film 72 is laminated on an upper surface of the second electrode film 70. The insulating film 72 is, for example, a thin film constituted of silicon oxide. A space above the insulating film 72 constitutes the first air reaction path 10 of the first fuel cell 4 and the second air reaction path 18 of the second fuel cell 14. A plurality of through holes 72a is provided in the insulating film 72. As shown in FIG. 2, the plurality of through holes 72a is arranged in a 4-by-3 array for each first power generation element 4a and each second power generation element 14a. It should be noted that the number of the through holes 72a for each first power generation element 4a and each second power generation element 14a is not limited to the above number. In the first substrate 25, at positions where the through holes 72a are provided in the insulating film 72, the first fuel reaction path 12 (the first fuel reaction chambers 12c) is opposed to the first air reaction path 10 via the first electrode film 66, the electrolyte film 68, and the second electrode film 70. In the second substrate 27, at positions where the through holes 72a are provided in the insulating film 72, the second fuel reaction path 20 (the second fuel reaction chambers 20c) is opposed to the second air reaction path 18 via the first electrode film 66, the electrolyte film 68, and the second electrode film 70.

When the first fuel cell 4 and the second fuel cell 14 are heated to a predetermined temperature, for example 600 degrees Celsius, at the positions where the through holes 72a are provided in the insulating film 72, oxygen in the air passes through the second electrode film 70 having the porous structure, and reaches the electrolyte film 68. Then, oxygen is turned into oxide ions ($O^{2-}$) at a surface of the electrolyte film 68 due to the catalyst effect, and the oxide ions pass through the electrolyte film 68 and reach the first electrode film 66. Hydrogen in the fuel gas passes through the first electrode film 66 having the porous structure and reaches the electrolyte film 68, at which hydrogen reacts with the oxide ions, as a result of which vapor is generated and electrons are emitted. The emitted electrons are collected to the first electrode film 66. As such, the first fuel cell 4 and the second fuel cell 14 generate power. The vapor generated accompanying the reaction is emitted to the first fuel reaction path 12 (the first fuel reaction chambers 12c) and the second fuel reaction path 20 (the second fuel reaction chambers 20c).

As shown in FIGS. 2 and 3, the first heater 6 and the second heater 16 are arranged on an upper surface of the insulating film 72. The first heater 6 and the second heater 16 are metal films constituted of, for example, Pt, Ta, W, WSi, or the like. The first heater 6 is arranged so as to snake through between the through holes 72a of the first power generation elements 4a. The second heater 16 is arranged so as to snake through between the through holes 72a of the second power generation elements 14a.

Power from the battery 8, which is a dry battery, is supplied to the first heater 6 via electrode pads 74a, 74b. Power from the first fuel cell 4 is supplied to the second heater 16 via electrode pads 76a, 76b. The electrode pad 76a is arranged on the upper surface of the first electrode film 66 at the first substrate 25, and the electrode pad 76b is arranged on the upper surface of the second electrode film 70 at the first substrate 25. Power from the second fuel cell. 14 is supplied to output electrode pads 80a, 80b via electrode pads 78a, 78b. The electrode pad 78a is arranged on the upper surface of the first electrode film 66 at the second substrate 27, and the electrode pad 78b is arranged on the upper surface of the second electrode film 70 at the second substrate 27. The output electrode pads 80a, 80b are connected to the target load L (see FIG. 1). The electrode pads 74a, 74b, 76a, 76b, 78a, 78b, the output electrode pads 80a, 80b, and wires that connect these pads may be constituted of conductive material(s) having durability against a high temperature between 500 to 700 degrees Celsius, and may be constituted of metal such as Pt/Cr, Pt/Ni, Mo, Ta, W, WSi and the like.

In the fuel cell system 2 of the present embodiment, the first substrate 25 and the second substrate 27 each are constituted of the laminated plate of the silicon substrate, and the first substrate 25 and the second substrate 27 are seamlessly continuous. Since the silicon substrate has a high thermal conductivity, and the first substrate 25 and the second substrate 27 are continuous seamlessly, heat generated accompanying the power generation of the first fuel cell 4 can be transferred to the second fuel cell 14 favorably. It should be noted that the first substrate 25 and the second substrate 27 may be seamlessly continuous in at least one of the first silicon substrate 62 and the second silicon substrate 64, and the other one of the first silicon substrate 62 and the second silicon substrate 64, the first electrode film 66, the electrolyte film 68, the second electrode film 70, and the insulating film 72 may be provided separately for each of the first substrate 25 and the second substrate 27. Further, a configuration may be employed in which the first substrate 25 and the second substrate 27 are physically separated, and they are provided on different silicon substrates (not shown).

Second Embodiment

Figure 5:
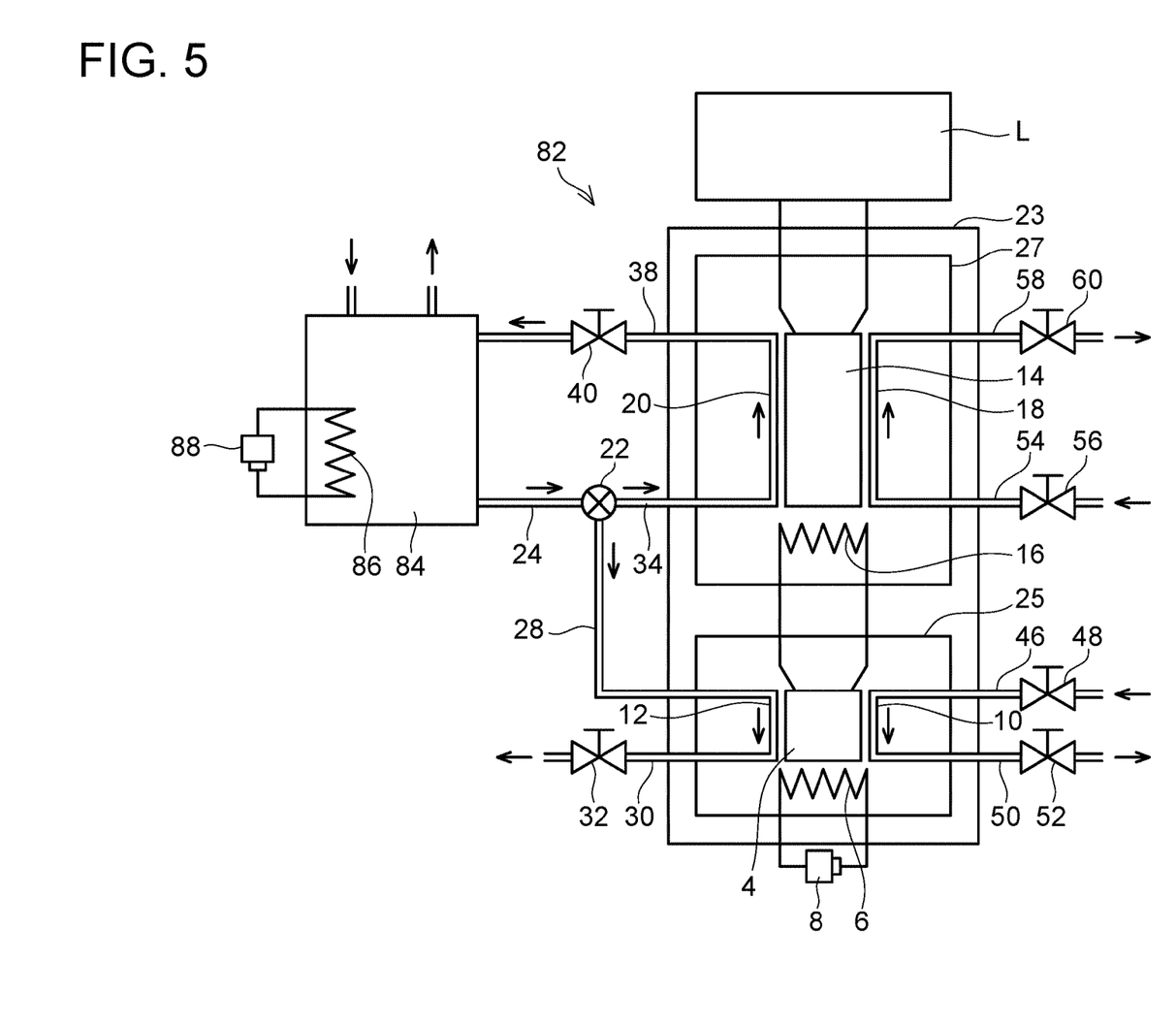
FIG. 5 is a block diagram of a fuel cell system 82 of a second embodiment.

FIG. 5 schematically shows a configuration of a fuel cell system 82 of a second embodiment. The fuel cell system 82 of the present embodiment comprises a substantially same configuration as the fuel cell system 2 of the first embodiment. Hereinbelow, features of the fuel cell system 82 of the present embodiment, which are different from those of the fuel cell system 2 of the first embodiment, will be described.

In the fuel cell system 82 of the present embodiment, hydrogen is supplied, as the fuel gas, to the three-way valve 22 from a reformer 84. The reformer 84 decomposes ammonia gas which is supplied from an ammonia gas cartridge (not shown) to generate nitrogen and hydrogen. Then, the reformer 84 supplies hydrogen to the fuel supply path 24 and discharges nitrogen to the outside of the fuel cell system 82. Since the decomposition reaction of ammonia gas is an endothermic reaction, the reformer 84 comprises a heater 86 for decomposing ammonia gas, and a battery 88 for supplying power to the heater 86, it should be noted that, similarly to the fuel cell system 2 of the first embodiment, the reformer 84 may accommodate a fuel collector for separating post-reaction fuel gas, which was discharged from the second fuel cell 14, into vapor and hydrogen. In this case, hydrogen separated from the post-reaction fuel gas as well as hydrogen decomposed from the ammonia gas is supplied to the fuel supply path 24 as the fuel gas, and the vapor separated from the post-reaction fuel gas is discharged to the outside of the fuel cell system 82, together with nitrogen decomposed from the ammonia gas.

Figure 6:
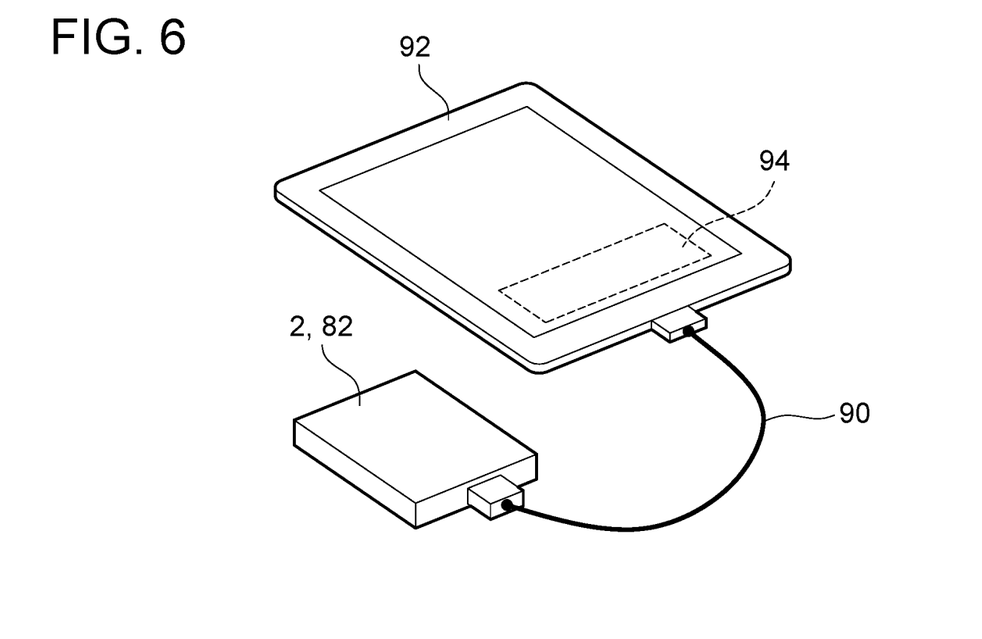
FIG. 6 is a diagram showing an example of application of the fuel cell system 2 of the first embodiment and the fuel cell system 82 of the second embodiment.

According to the fuel cell system 2 of the first embodiment and the fuel cell system 82 of the second embodiment, fuel cells can be activated in a short period of time. Due to this, a fuel cell capable of repeating activation and stop in a short period of time can be realized. Therefore, the fuel cell system 2 of the first embodiment and the fuel cell system 82 of the second embodiment can be used for unconventional applications. For example, as shown in FIG. 6, the fuel cell systems 2, 82 can be used as a charger that is connectable to a mobile device 92, such as a tablet, via a charging cable 90. In this case, by employing a configuration in which a battery 94 included in the mobile device 92, a power load of the mobile device 92, and the fuel cell systems 2, 82 are electrically connected in parallel, and in which power supply destinations can be switched by a selector switch, the fuel cell systems 2, 82 can charge the battery 94 and also supply power to the power load of the mobile device 92.

Figure 7:
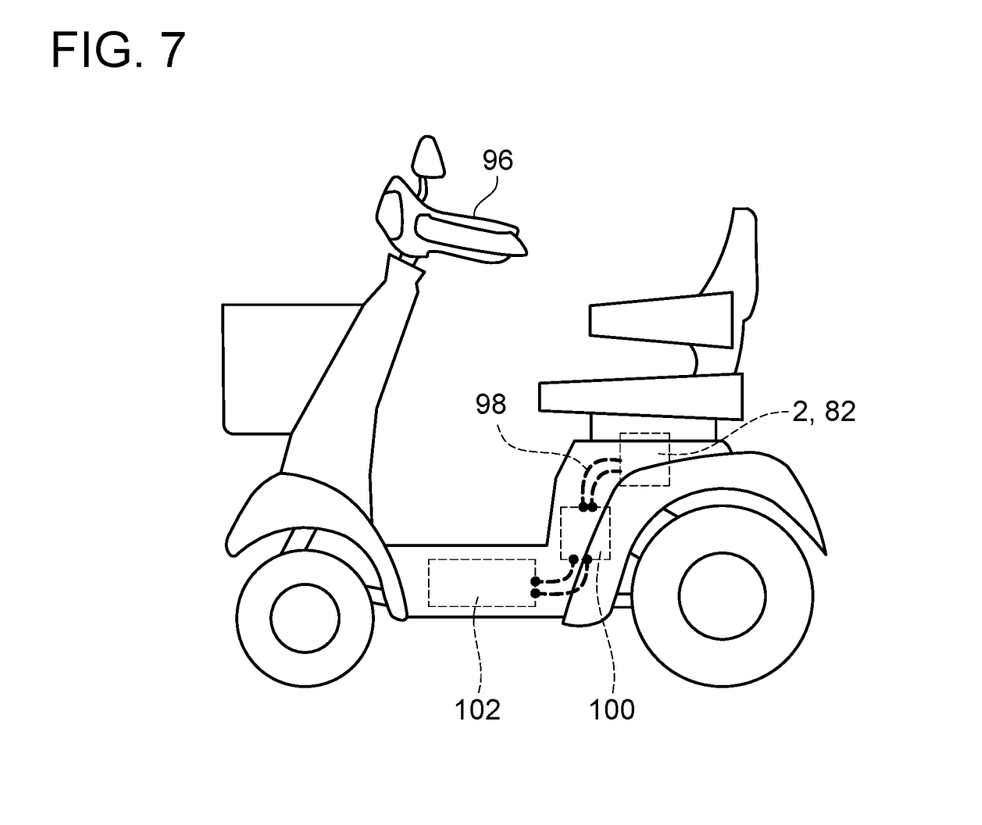
FIG. 7 is a diagram showing another example of application of the fuel cell system 2 of the first embodiment and the fuel cell system 82 of the second embodiment.

Alternatively, as shown in FIG. 7, the fuel cell systems 2, 82 can be used as a sub-battery that is mounted in a power-driven compact mobility vehicle 96 (e.g., a mobility scooter). In this case, the fuel cell systems 2, 82 are connected to a battery 100 included in the compact mobility vehicle 96 via a power supply wire 98. In this case, by employing a configuration in which the battery 100 included in the compact mobility vehicle 96, a motor 102 of the compact mobility vehicle 96, and the fuel cell systems 2, 82 are electrically connected in parallel, and in which power supply destinations can be switched by a selector switch, the fuel cell systems 2, 82 can charge the battery 100 and also supply power to the motor 102.

Figure 8:
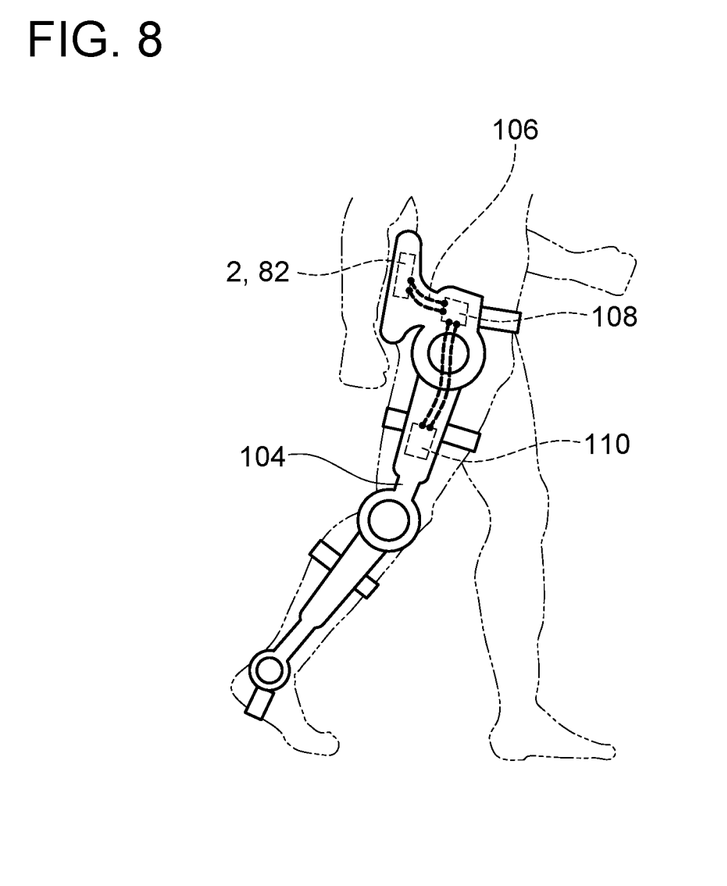
FIG. 8 is a diagram showing yet another example of application of the fuel cell system 2 of the first embodiment and the fuel cell system 82 of the second embodiment.

Alternatively, as shown in FIG. 8, the fuel cell systems 2, 82 can be used as a sub-battery of a power-driven walking support robot 104. In this case, the fuel cell, systems 2, 82 are connected to a battery 108 included in the walking support robot 104 via a power supply wire 106. In this case, by employing a configuration in which the battery 108 included in the walking support robot 104, a motor 110 of the walking support robot 104, and the fuel cell systems 2, 82 are electrically connected in parallel, and in which power supply destinations can be switched by a selector switch, the fuel cell systems 2, 82 can charge the battery 108 and also supply power to the motor 110.

In the aforementioned embodiments, the cases where the first fuel cell 4 and the second fuel cell 14 are solid-oxide fuel cells (SOFC) have been described. However, the first fuel cell 4 and the second fuel cell 14 may be any fuel cells so long as they are fuel cells that are required to be heated to a temperature higher than the ordinary temperature upon a start of a reaction for power generation. For example, the first fuel cell 4 and the second fuel cell 14 may be polymer electrolyte fuel cell (PEFC), phosphoric-acid fuel cell (PAFC), or molten carbonate fuel cell (MCFC).

What is claimed is:
1. A fuel cell system comprising:
a first fuel cell comprising first power generation elements provided on a first substrate;
a second fuel cell comprising second power generation elements provided on a second substrate, and having a power generation capacity higher than a power generation capacity of the first fuel cell;
a first heater provided at the first fuel cell;
a second heater provided at the second fuel cell; and
a battery; wherein
the number of the second power generation elements is larger than the number of the first power generation elements,
the first heater is arranged so as to snake through between through holes of the first power generation elements,
the second heater is arranged so as to snake through between through holes of the second power generation elements,
the first heater heats the first fuel cell by using power supplied from the battery,
the second heater heats the second fuel cell by using power supplied from the first fuel cell, and
the fuel cell system is programmed to terminate power generation in the first fuel cell and start power generation in the second fuel cell when a temperature of the second fuel cell reaches a predetermined reaction temperature.
2. The fuel cell system according to claim 1, wherein the first substrate and the second substrate are provided on a third substrate which is different from the first substrate and the second substrate.

3. The fuel cell system according to claim 1, wherein the first substrate and the second substrate are seamlessly continuous and not physically separated.

4. The fuel cell system according to claim 1, wherein the first heater is provided on the first substrate, and wherein the second heater is provided on the second substrate.

5. The fuel cell system according to claim 1, wherein discharge of a fuel gas and/or air from the first fuel cell is prohibited when the first heater heats the first fuel cell.

6. The fuel cell system according to claim 1, further comprising one or more valves configured to supply a fuel gas to the first fuel cell.

7. The fuel cell system according to claim 1, further comprising one or more valves configured to supply a fuel gas to the second fuel cell.

8. The fuel cell system according to claim 1, further comprising one or more valves configured to supply a fuel gas to the first fuel cell and/or the second fuel cell.

9. The fuel cell system according to claim 8, wherein the one or more valves comprise a three-way valve configured to switch supplying destinations of the fuel gas between the first fuel cell and the second fuel cell.

10. The fuel cell system according to claim 9, wherein the fuel cell system is configured such that the termination of the power generation in the first fuel cell occurs when the supply destination of the fuel gas is switched from the first fuel cell to the second fuel cell when the temperature of the second fuel cell reaches the predetermined reaction temperature.

11. The fuel cell system according to claim 9, wherein the fuel cell system is configured such that the starting of the power generation in the second fuel cell occurs when the supply destination of the fuel gas is switched from the first fuel cell to the second fuel cell when the temperature of the second fuel cell reaches the predetermined reaction temperature.

12. The fuel cell system according to claim 9, wherein the fuel cell system is configured such that the termination of the power generation in the first fuel cell and the starting of the power generation in the second fuel cell occur when the supply destination of the fuel gas is switched from the first fuel cell to the second fuel cell when the temperature of the second fuel cell reaches the predetermined reaction temperature.

13. A mobile device comprising a battery, wherein the fuel cell system according to claim 1 is electrically connected to the battery.

14. The mobile device according to claim 13, wherein the fuel cell system is connected to the mobile device via a charging cable.

* * * * *